(12) United States Patent
Govari et al.

(10) Patent No.: US 12,514,635 B2
(45) Date of Patent: Jan. 6, 2026

(54) CATHETER AND SYSTEM FOR COMBINED ABLATION MODALITIES

(71) Applicant: Biosense Webster (Israel) Ltd., Yokneam (IL)

(72) Inventors: Assaf Govari, Haifa (IL); Andres Claudio Altmann, Haifa (IL); Christopher Thomas Beeckler, Brea, CA (US)

(73) Assignee: Biosense Webster (Israel) Ltd., Yokneam (IL)

( * ) Notice: Subject to any disclaimer, the term of this patent is extended or adjusted under 35 U.S.C. 154(b) by 372 days.

(21) Appl. No.: 18/317,698

(22) Filed: May 15, 2023

(65) Prior Publication Data
US 2024/0341840 A1   Oct. 17, 2024

Related U.S. Application Data

(60) Provisional application No. 63/496,218, filed on Apr. 14, 2023.

(51) Int. Cl.
*A61B 18/12* (2006.01)
*A61B 18/14* (2006.01)
(Continued)

(52) U.S. Cl.
CPC .......... *A61B 18/1492* (2013.01); *A61B 34/10* (2016.02); *A61B 2017/00172* (2013.01);
(Continued)

(58) Field of Classification Search
CPC ................ A61B 18/1492; A61B 34/10; A61B 2018/00351; A61B 2018/00613; A61B 2018/00708; A61B 2018/00732; A61B 2018/00761; A61B 2018/00886; A61B 2018/00904; A61B 2018/1266;
(Continued)

(56) References Cited

U.S. PATENT DOCUMENTS 5,391,199 A   2/1995   Ben-Haim
5,443,489 A   8/1995   Ben-Haim
(Continued)

FOREIGN PATENT DOCUMENTS

WO   2023009586 A1   2/2023

OTHER PUBLICATIONS

Extended European Search Report and Opinion dated Sep. 24, 2024, from corresponding European Application No. 24169840.6.

*Primary Examiner* — Daniel W Fowler

(57) ABSTRACT

The disclosed technology includes a system for applying pulsed field ablation to treat atrial fibrillation. The system includes a catheter and a processor. The catheter can include a tip electrode controlled to emit either a pulsed electric field or a radiofrequency signal to biological tissue and ablate one or more locations of biological tissue of the pulmonary vein. The processor is configured to measure a contact force experienced by the tip electrode against biological tissue during pulsed electric field ablation and determine a pulsed field ablation index as a function of the measured contact force and number of pulsed electric field applications for each location of the one or more locations so that it can be determined whether a lesion is sufficiently durable.

20 Claims, 9 Drawing Sheets

(51) Int. Cl.
*A61B 34/10* (2016.01)
*A61B 17/00* (2006.01)
*A61B 18/00* (2006.01)
*A61B 90/00* (2016.01)

(52) U.S. Cl.
CPC ............. *A61B 2018/00351* (2013.01); *A61B 2018/00577* (2013.01); *A61B 2018/00666* (2013.01); *A61B 2018/00708* (2013.01); *A61B 2018/00732* (2013.01); *A61B 2018/00761* (2013.01); *A61B 2018/00767* (2013.01); *A61B 2018/00904* (2013.01); *A61B 2018/1266* (2013.01); *A61B 2018/1273* (2013.01); *A61B 2090/065* (2016.02)

(58) Field of Classification Search
CPC ...... A61B 2018/1473; A61B 2090/064; A61B 2090/065
See application file for complete search history.

(56) References Cited

U.S. PATENT DOCUMENTS

| | | | |
|---|---|---|---|
| 5,558,091 A | 9/1996 | Acker et al. | |
| 5,906,614 A | 5/1999 | Stern et al. | |
| 6,172,499 B1 | 1/2001 | Ashe | |
| 6,239,724 B1 | 5/2001 | Doron et al. | |
| 6,332,089 B1 | 12/2001 | Acker et al. | |
| 6,484,118 B1 | 11/2002 | Govari | |
| 6,618,612 B1 | 9/2003 | Acker et al. | |
| 6,690,963 B2 | 2/2004 | Ben-Haim et al. | |
| 6,788,967 B2 | 9/2004 | Ben-Haim et al. | |
| 6,892,091 B1 | 5/2005 | Ben-Haim et al. | |
| 7,306,593 B2 | 12/2007 | Keider et al. | |
| 7,536,218 B2 | 5/2009 | Govari et al. | |
| 7,756,576 B2 | 7/2010 | Levin | |
| 7,848,787 B2 | 12/2010 | Osadchy | |
| 7,869,865 B2 | 1/2011 | Govari et al. | |
| 8,357,152 B2 | 1/2013 | Govari et al. | |
| 8,456,182 B2 | 6/2013 | Bar-Tal et al. | |
| 9,492,639 B2 | 11/2016 | Clark et al. | |
| 10,517,670 B2 | 12/2019 | Bar-Tal et al. | |
| 10,688,278 B2 | 6/2020 | Beeckler et al. | |
| 10,869,713 B2 | 12/2020 | Govari | |
| 11,096,741 B2 | 8/2021 | Govari et al. | |
| 11,540,877 B2 | 1/2023 | Altmann et al. | |
| 2008/0045946 A1* | 2/2008 | Vaska | A61B 18/02 606/49 |
| 2010/0069921 A1* | 3/2010 | Miller | A61B 18/1233 600/301 |
| 2016/0095653 A1* | 4/2016 | Lambert | A61B 18/1492 606/41 |
| 2017/0014181 A1 | 1/2017 | Bar-Tal et al. | |
| 2018/0221078 A1* | 8/2018 | Howard | A61B 18/14 |
| 2019/0038349 A1* | 2/2019 | Koblish | A61B 5/6885 |
| 2021/0145534 A1* | 5/2021 | Kulstad | A61F 7/123 |
| 2021/0177503 A1* | 6/2021 | Altmann | A61B 18/00 |
| 2021/0186604 A1 | 6/2021 | Altmann et al. | |
| 2022/0133172 A1* | 5/2022 | Ransbury | A61B 18/1492 600/473 |
| 2022/0401146 A1 | 12/2022 | Asconeguy et al. | |

\* cited by examiner

| Device | Function |
|---|---|
| Catheter 14 | Transmits energy to the target tissue. |
| Generator 50 | Delivers PF and RF energy to compatible ablation catheter |
| Additional Equipment | Function |
| CARTO™ 3 SYSTEM V7.9 workstation | For mapping and visualization information with software for PF and RF |
| nGEN™ Pump | Delivers heparinized saline to the catheter |
| Sterile Catheter Connection Cable (CR3434CT) | Connects the STSF Catheter with the TRUPULSE™ Generator. |
| SmartAblate Irrigation Tubing Sets (SAT001) | Delivers heparinized saline to the catheter |
| BW Multi-Electrode mapping Catheter | • Pre-ablation recording and mapping of the atria of the heart with the CARTO™ 3 System.<br>• Confirmation of entrance block |
| ≥8.5 Fr compatible sheath used with STSF catheter. | Facilitate deployment of catheter into the atria. |
| Adhesive electrical dispersive pads/indifferent split electrode (with a surface area of ≥ 124 $cm^2$ that conform with IEC/EN 60601-2-2) | Component of the RF / PF current return path (Valley Lab recommended) |
| EP Lab Recording Equipment | Records multiple intracardiac electrograms and signals from Generator 50 and performs electrical stimulation. |
| Esophageal Temperature Monitoring Device (OPTIONAL) | Esophageal temperature monitoring |

FIG. 5

|  | PF Mode | RF Mode |
|---|---|---|
| Idle Mode | 2 ml/min | 2 ml/min |
| During Ablation | 4 ml/min | Dependent on target power:<br>≤30W: 8ml/min<br>>30W: 15ml/min |

CATHETER AND SYSTEM FOR COMBINED ABLATION MODALITIES

CROSS REFERENCE TO RELATED APPLICATIONS

This application claims the benefit of priority under 35 U.S.C. § 119 to prior filed U.S. Provisional Patent Application No. 63/496,218 filed on Apr. 14, 2023, the entire contents of which is hereby incorporated by reference as if set forth in full herein.

FIELD

This disclosure relates to devices and methods of performing pulsed field ablation within or near a heart. The devices and methods may also be useful for mapping and/or thermal ablation using radio frequency electrical signals.

BACKGROUND

Cardiac arrhythmias, such as atrial fibrillation (AF), occur when regions of cardiac tissue abnormally conduct electric signals to adjacent tissue, thereby disrupting the normal cardiac cycle and causing asynchronous rhythm. Sources of undesired signals are typically located in tissue of the atria and ventricles. Regardless of source, unwanted signals are conducted elsewhere through heart tissue where they can initiate or continue arrhythmia.

Treatment of cardiac arrhythmia can include disrupting the conducting pathway of electrical signals causing arrhythmia to cease or modify the propagation of unwanted electrical signals from one portion of the heart to another. Such procedures typically include a two-step process: (1) mapping; and (2) ablation. During mapping, a catheter having an end effector having preferably a high density of electrodes is moved across target tissue, electrical signals are acquired from each electrode, and a map is generated based on the acquired signals. During ablation, non-conducting lesions are formed at regions selected based on the map to disrupt electrical signals through those regions. Presently the most common ablation technique involves applying radio frequency (RF) electrical signals via electrodes to tissue to generate heat. Irreversible electroporation (IRE) ablation is a more recently developed technique which involves applying short duration high voltage pulses across tissue to cause cell death, sometimes referred to as pulsed field ablation (PFA). Typically, RF and PFA are applied as separate and distinct techniques. The lesion created by PFA ablation is related to the parameters of the pulses, the number of PFA applications as well as the contact force at which the ablation electrodes are pressed against the tissue wall. Typically, the parameter of the pulses is preset, e.g., amplitude, duration, number of pulses in a train, etc. and the number of PFA applications as well as the contact force can be manipulated by the user; however, a user may not be sure how much contact force and/or number of applications is needed to obtain a desired lesion depth.

Previous solutions have used two or more separate catheters (e.g., one for the electropotentials and temperature measurements, and another for the ablation) with no indication of desired lesion depth. Embodiments disclosed herein facilitate the two measurements, enable ablation using radiofrequency electromagnetic energy using a single catheter, and in addition predict a PFA ablation index before ablation is initiated.

SUMMARY

Generally, examples presented herein can include a system for applying pulsed field ablation to treat atrial fibrillation. The system can include a catheter and a processor. The catheter can include a tip electrode controlled to emit either a pulsed electric field or a radiofrequency signal to biological tissue and ablate one or more locations of biological tissue of the pulmonary vein. The processor can be configured to measure a contact force experienced by the tip electrode against biological tissue during pulsed electric field ablation, and determine a pulsed field ablation index as a function of the measured contact force and number of pulsed electric field applications for each location of the one or more locations so that it can be determined whether a lesion is sufficiently durable.

An exemplary embodiment of the present disclosure includes a focal ablation catheter. The focal ablation catheter can include a tubular member extending along a longitudinal axis between a handle, a contact force sensor, and a tip electrode at a distal end of the tubular member. The tip electrode can be electrically connected to an energy generator controlled to emit either a pulsed electric field or a radiofrequency signal to biological tissue through the tip electrode at one or more locations of biological tissue under control of a processor to ablate biological tissue. The contact force sensor can be physically connected to the tip electrode and electrically connected to the processor to provide indication of a contact force experienced by the tip electrode against biological tissue during pulsed electric field ablation so that an ablation index is determined as a function of the measured contact force of the tip electrode and number of pulsed electric field applications for each location of the one or more locations in a heart.

An exemplary embodiment of the present disclosure includes a method for applying pulsed field ablation to treat atrial fibrillation. The method can include delivering a tip electrode. The method can also include emitting, from the tip electrode, either a pulsed electric field or a radiofrequency signal to biological tissue and measuring a contact force experienced by the tip electrode against biological tissue during emission of a pulsed electric field. The method also includes ablating one or more locations of targeted tissues of the pulmonary vein with the tip electrode and determining an ablation index as a function of a representation of the measured contact force of the tip electrode and number of pulsed electric field applications for each location of the one or more locations from the pulsed electric field ablation so that a determination can be made as to whether a lesion is sufficiently durable.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation.

FIG. 5 is a table summarizing an example of the devices and their functions, in accordance with the disclosed technology.

DETAILED DESCRIPTION

Figure 1:
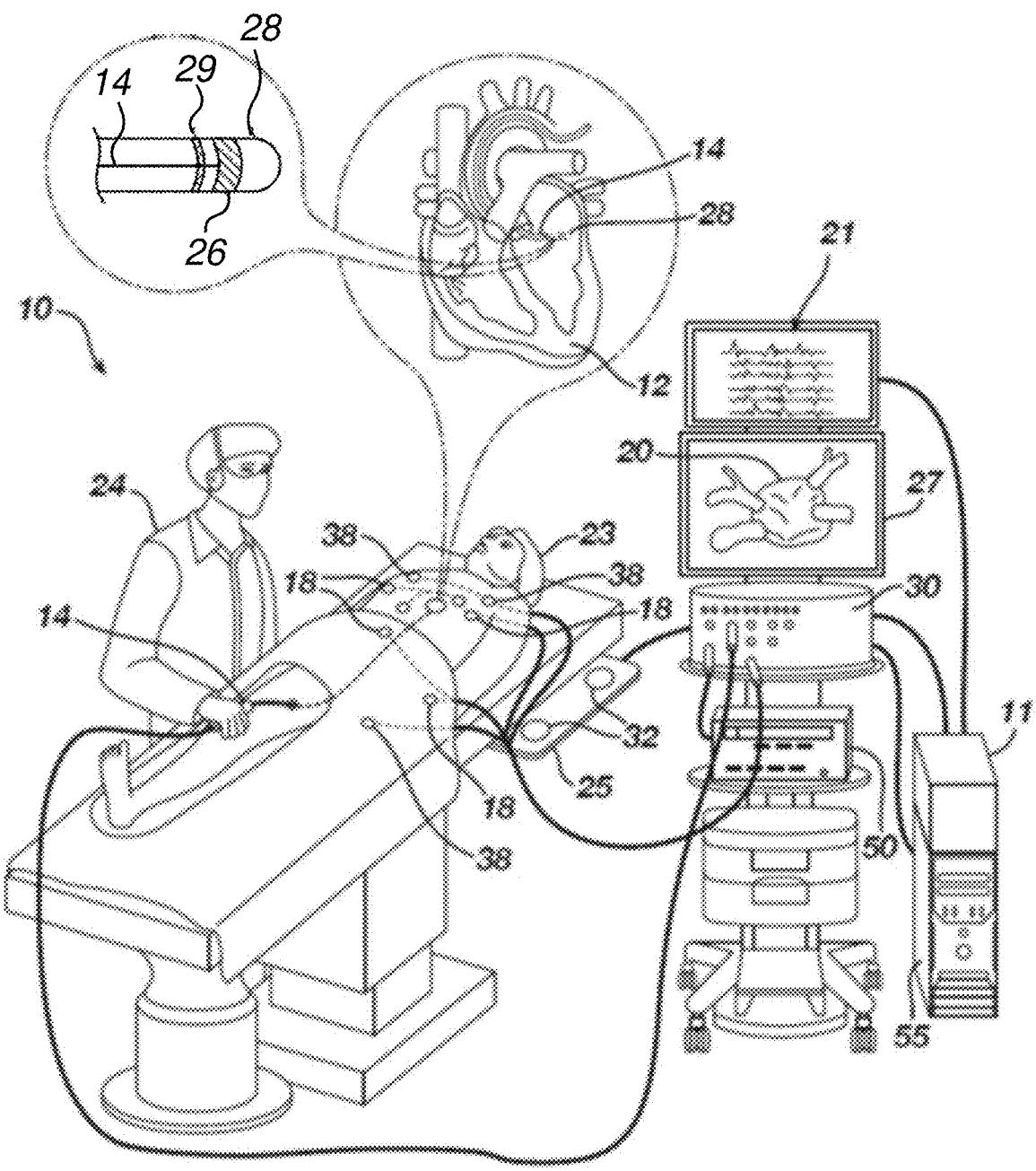
FIG. 1 is a schematic pictorial illustration of a medical system including an example medical probe which can be used in accordance with the disclosed technology.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways. Features of embodiments disclosed herein, including those disclosed in the appendix to priority application U.S. 63/496,218, can be combined as understood by a person skilled in the pertinent art according to the teachings herein.

As used herein, the terms "about" or "approximately" for any numerical values or ranges indicate a suitable dimensional tolerance that allows the part or collection of components to function for its intended purpose as described herein. More specifically, "about" or "approximately" can refer to the range of values ±20% of the recited value, e.g. "about 90%" can refer to the range of values from 71% to 99%.

As discussed herein, vasculature of a "subject" or "patient" can be vasculature of a human or any animal. It should be appreciated that an animal can be a variety of any applicable type, including, but not limited thereto, mammal, veterinarian animal, livestock animal or pet type animal, etc. As an example, the animal can be a laboratory animal specifically selected to have certain characteristics similar to a human (e.g., rat, dog, pig, monkey, or the like). It should be appreciated that the subject can be any applicable human patient, for example.

As discussed herein, "operator" can include a doctor, physician, surgeon, or any other individual or delivery instrumentation associated with delivery of a multi-electrode RF balloon catheter for the treatment of drug refractory atrial fibrillation to a subject.

As discussed herein, "NIHSS Score" means The National Institutes of Health Stroke Scale, or NIH Stroke Scale (NIHSS) and is a tool used by healthcare providers to objectively quantify the impairment caused by a stroke. The NIHSS is composed of 11 items, each of which scores a specific ability between a 0 and 4. For each item, a score of 0 typically indicates normal function in that specific ability, while a higher score is indicative of some level of impairment. The individual scores from each item are summed in order to calculate a patient's total NIHSS score. The maximum possible score is 42, with the minimum score being a 0.

As discussed herein, "mRS" means the modified Rankin Scale (mRS) that is a commonly used scale for measuring the degree of disability or dependence in the daily activities of people who have suffered a stroke or other causes of neurological disability. The mRS scale runs from 0-6, running from perfect health without symptoms to death. An mRS score of 0 is understood as no symptoms being observed. An mRS score of 1 is understood as no significant disability is observed and the patient is able to carry out all usual activities, despite some symptoms. An mRS score of 2 is understood as slight disability and the patient is able to look after own affairs without assistance, but unable to carry out all previous activities. An mRS score of 3 is understood as moderate disability whereby the patient can require some help but is able to walk unassisted. An mRS score of 4 is understood as moderate severe disability and the patient is unable to attend to own bodily needs without assistance or walk unassisted. An mRS score of 5 is understood as severe disability and the patient requires constant nursing care and attention, bedridden, incontinent. An mRS score of 6 is understood as the patient being deceased.

As discussed herein, the term "safety," as it relates to devices used in ablating cardiac tissue, related delivery systems, or method of treatment refers to a relatively low severity of adverse events, including adverse bleeding events, infusion or hypersensitivity reactions. Adverse bleeding events can be the primary safety endpoint and include, for example, major bleeding, minor bleeding, and the individual components of the composite endpoint of any bleeding event.

As discussed herein, unless otherwise noted, the term "clinically effective" (used independently or to modify the term "effective") can mean that it has been proven by a clinical trial wherein the clinical trial has met the approval standards of U.S. Food and Drug Administration, EMEA or a corresponding national regulatory agency. For example, a clinical study can be an adequately sized, randomized, double-blinded controlled study used to clinically prove the effects of the cardiac ablation device(s) and related system(s) of this disclosure. Most preferably to clinically prove the effects of the device(s) with respect to all targeted pulmonary veins, for example, to achieve a clinically effective outcome in for the patient and/or achieve pulmonary vein isolation in those afflicted veins.

As discussed herein, the term "ablate" or "ablation," as it relates to the devices and corresponding systems of this disclosure, refers to components and structural features configured to reduce or prevent the generation of erratic cardiac signals. Non-thermal ablation includes use of irreversible electroporation (IRE) to cause cell death, referred throughout this disclosure interchangeably as pulsed electric field (PEF) and pulsed field ablation (PFA). Thermal ablation includes use of extreme temperature to cause cell death and includes RF ablation. Ablating or ablation as it relates to the devices and corresponding systems of this disclosure is used throughout this disclosure in reference to ablation of cardiac tissue for certain conditions including, but not limited to, arrhythmias, atrial flutter ablation, pulmonary vein isolation, supraventricular tachycardia ablation, and ventricular tachycardia ablation. The term "ablate" or "ablation" as it generally relates to known methods, devices, and systems includes various forms of bodily tissue ablation as understood by a person skilled in the pertinent art.

As discussed herein, the terms "bipolar" and "unipolar" when used to refer to ablation schemes describe ablation schemes which differ with respect to electrical current path and electric field distribution. "Bipolar" refers to ablation scheme utilizing a current path between two electrodes that are both positioned at a treatment site; current density and electric flux density is typically approximately equal at each of the two electrodes. "Unipolar" refers to ablation scheme utilizing a current path between two electrodes where one electrode having a high current density and high electric flux density is positioned at a treatment site, and a second electrode having comparatively lower current density and lower electric flux density is positioned remotely from the treatment site.

As discussed herein, the terms "biphasic pulse" and "monophasic pulse" refer to respective electrical signals. "Biphasic pulse" refers to an electrical signal having a positive-voltage phase pulse (referred to herein as "positive phase") and a negative-voltage phase pulse (referred to herein as "negative phase"). "Monophasic pulse" refers to an electrical signal having only a positive or only a negative phase. Preferably, a system providing the biphasic pulse is configured to prevent application of a direct current voltage (DC) to a patient. For instance, the average voltage of the biphasic pulse can be zero volts with respect to ground or other common reference voltage. Additionally, or alternatively, the system can include a capacitor or other protective component. Where voltage amplitude of the biphasic and/or monophasic pulse is described herein, it is understood that the expressed voltage amplitude is an absolute value of the approximate peak amplitude of each of the positive-voltage phase and/or the negative-voltage phase. Each phase of the biphasic and monophasic pulse preferably has a square shape having an essentially constant voltage amplitude during a majority of the phase duration. Phases of the biphasic pulse are separated in time by an interphase delay. The interphase delay duration is preferably less than or approximately equal to the duration of a phase of the biphasic pulse. The interphase delay duration is more preferably about 25% of the duration of the phase of the biphasic pulse.

As discussed herein, the terms "tubular" and "tube" are to be construed broadly and are not limited to a structure that is a right cylinder or strictly circumferential in cross-section or of a uniform cross-section throughout its length. For example, the tubular structures are generally illustrated as a substantially right cylindrical structure. However, the tubular structures may have a tapered or curved outer surface without departing from the scope of the present disclosure.

Previous solutions have used two or more separate instructions (e.g., one for the electropotentials and temperature measurements, and another for the ablation), embodiments disclosed herein facilitate the two measurements, and in addition enable ablation using radiofrequency electromagnetic energy, using a single catheter. The catheter has a lumen, and a balloon is deployed through the catheter lumen (the balloon travels through the lumen in a collapsed, uninflated configuration, and the balloon is inflated on exiting the lumen). The balloon has an exterior wall or membrane and has a distal end and a proximal end which define a longitudinal axis that extends the lumen.

Reference is made to FIG. 1 showing an example catheter-based electrophysiology mapping and ablation system 10. To perform the ablation, the operator 24 inserts a delivery sheath catheter 14 through the patient's vascular system into a chamber or vascular structure of a heart 12. Typically, a delivery sheath catheter 14 is inserted into the left or right atrium near a desired location in heart 12. Thereafter, a plurality of catheters can be inserted into the delivery sheath catheter so as to arrive at the desired location. The plurality of catheters may include catheters dedicated for sensing Intracardiac Electrogram (IEGM) signals, catheters dedicated for ablating, and/or catheters dedicated for sensing, IRE, and ablating. Operator 24 can position a distal tip 28 of catheter 14 in contact with the heart wall for sensing a target site in heart 12. For ablation/IRE, operator 24 would similarly bring a distal end of a catheter to a target site. Ablation/IRE catheter 14 can be a multi-electrode radiofrequency balloon catheter for cardiac electrophysiological ablation of pulmonary veins of the atria and, when used with a multi-channel generator, for the treatment of drug refractory recurrent symptomatic PAF, as discussed more particularly below. Note that such catheters 24 can be introduced through the femoral artery, wrist artery (radial access) or directly through the carotid artery. While both radial and carotid access avoids the aortic arches, there are other drawbacks. However, all three approaches are considered to be known to ones of skill in this art.

Catheter 14 is an exemplary catheter that includes one and preferably multiple electrodes 26 optionally distributed over a plurality of spines (not depicted) at distal tip 28 and configured to sense the IEGM signals. Catheter 14 may additionally include a position sensor 29 embedded in or near distal tip 28 for tracking position and orientation of distal tip 28. Optionally and preferably, position sensor 29 is a magnetic based position sensor including three magnetic coils for sensing three-dimensional (3D) position and orientation.

Magnetic based position sensor 29 may be operated together with a location pad 25 including a plurality of external magnetic coils 32 configured to generate magnetic fields in a predefined working volume. Real time position of distal tip 28 of catheter 14 may be tracked based on magnetic fields generated with location pad 25 and sensed by magnetic based position sensor 29. Details of the magnetic based position sensing technology are described in U.S. Pat. Nos. 5,391,199; 5,443,489; 5,558,091; 6,172,499; 6,239,724; 6,332,089; 6,484,118; 6,618,612; 6,690,963; 6,788,967; 6,892,091.

System 10 includes one or more electrode patches 38 positioned for skin contact on patient 23 to establish location reference for location pad 25 as well as impedance-based tracking of electrodes 26. For impedance-based tracking, electrical current is directed toward electrodes 26 and sensed at electrode skin patches 38 so that the location of each electrode can be triangulated via the electrode patches 38. Details of the impedance-based location tracking technology are described in U.S. Pat. Nos. 7,536,218; 7,756,576; 7,848,787; 7,869,865; and 8,456,182.

A recorder 11 displays electrograms 21 captured with body surface ECG electrodes 18 and intracardiac electrograms (IEGM) captured with electrodes 26 of catheter 14. Recorder 11 may include pacing capability for pacing the heart rhythm and/or may be electrically connected to a standalone pacer.

System 10 may include an ablation energy generator 50 that is adapted to conduct ablative energy to one or more of electrodes at a distal tip of a catheter configured for ablating. Energy produced by ablation energy generator 50 may include, but is not limited to, radiofrequency (RF) energy or pulsed-field ablation (PFA) energy, including monopolar or bipolar high-voltage DC pulses as may be used to effect irreversible electroporation (IRE), or combinations thereof. Generator 50 is controlled via a processor disposed in workstation 55 to emit RF energy (e.g., sine waves) at a preset power level (in Watts) over a predetermined duration (less than 60 seconds). Likewise, generator 50 can be controlled by the processor in workstation 55 to emit pulsed field energy (e.g., square waves) at ultra short duration in various pulses.

Generator 50 can include a specialized device for delivering Radiofrequency (RF) or Pulsed Field (PF) energy through catheter 14. RF energy is delivered in power-controlled ablation mode at the selected power setting to a site in the heart via the study catheter. PF energy consists of a series of short duration, high voltage, high-frequency, unipolar, biphasic pulses (or "trains" of pulses) being applied to a site in the heart via the study catheter 14. The generator 50 delivers PF energy in predefined voltage, pulse length, and number of pulses, which have been optimized in pre-clinical testing to target cardiac tissue and produce durable lesions. The generator 50 is compatible with the Biosense Webster CARTO™ 3 System, nGEN™ Pump and standard electrophysiology (EP) lab equipment. Generator 50 is indicated for use in conjunction with compatible cardiac ablation catheters to deliver RF or PF energy during cardiac ablation procedures.

Patient interface unit (PIU) 30 is an interface configured to establish electrical communication between catheters, electrophysiological equipment, power supply and a workstation 55 for controlling operation of system 10. Electrophysiological equipment of system 10 may include for example, multiple catheters, location pad 25, body surface ECG electrodes 18, electrode patches 38, ablation energy generator 50, and recorder 11. Optionally and preferably, PIU 30 additionally includes processing capability for implementing real-time computations of location of the catheters and for performing ECG calculations.

Workstation 55 includes memory, processor unit with memory or storage with appropriate operating software loaded therein, and user interface capability. Workstation 55 may provide multiple functions, optionally including (1) modeling the endocardial anatomy in three-dimensions (3D) and rendering the model or anatomical map 20 for display on a display device 27, (2) displaying on display device 27 activation sequences (or other data) compiled from recorded electrograms 21 in representative visual indicia or imagery superimposed on the rendered anatomical map 20, (3) displaying real-time location and orientation of multiple catheters within the heart chamber, and (5) displaying on display device 27 sites of interest such as places where ablation energy has been applied. One commercial product embodying elements of the system 10 is available as the CARTO™ 3 System, available from Biosense Webster, Inc., 31A Technology Drive, Irvine, CA 92618.

Figure 2A:
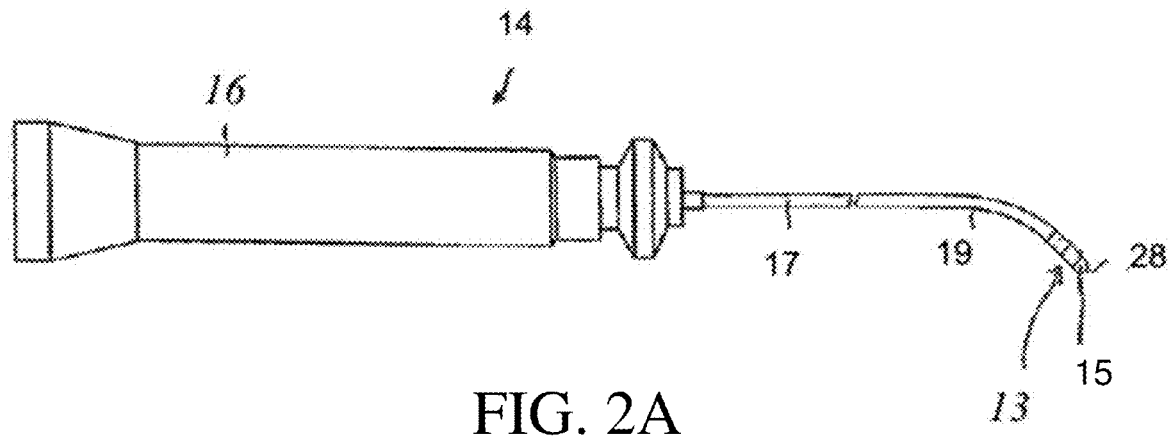
FIG. 2A is a side view of a catheter for use with the system of FIG. 1, in accordance with the disclosed technology.

As shown in FIG. 2A, the catheter 14 can include an elongated catheter body 17, a deflectable intermediate section 19, a distal section 13 carrying at least a tip electrode 15 on its distal tip end 28, and a control handle 16. The catheter 14 can be one that is a steerable multi-electrode luminal catheter with a deflectable tip designed to facilitate electrophysiological mapping of the heart 12 and to transmit radiofrequency (RF) and pulse field (PF) current to the tip electrode 15 for ablation purposes. An operator 24, such as a cardiologist, can insert catheter 14 through the vascular system of a patient 23 so that a distal section 13 of the catheter enters a chamber of the patient's heart 12. The operator 24 advances the catheter so that a distal tip 28 of the catheter engages endocardial tissue at a desired location or locations. Catheter 14 is connected by a suitable connector at its proximal end to console 55. The console 55 may include the ablation energy generator 50, which supplies high-frequency electrical energy via the catheter 14 for ablating tissue in the heart 12 at the locations engaged by the distal section 13. For ablation, the catheter 14 can be used in conjunction with a dispersive pad (e.g., indifferent electrode). In this respect, the catheter 14 can include a shaft that measures 7.5 F with 8 F ring electrodes. The catheter 14 can also have a force-sensing system that provides a real-time measurement of contact force between the catheter tip and the heart 12 wall.

Figure 2B:
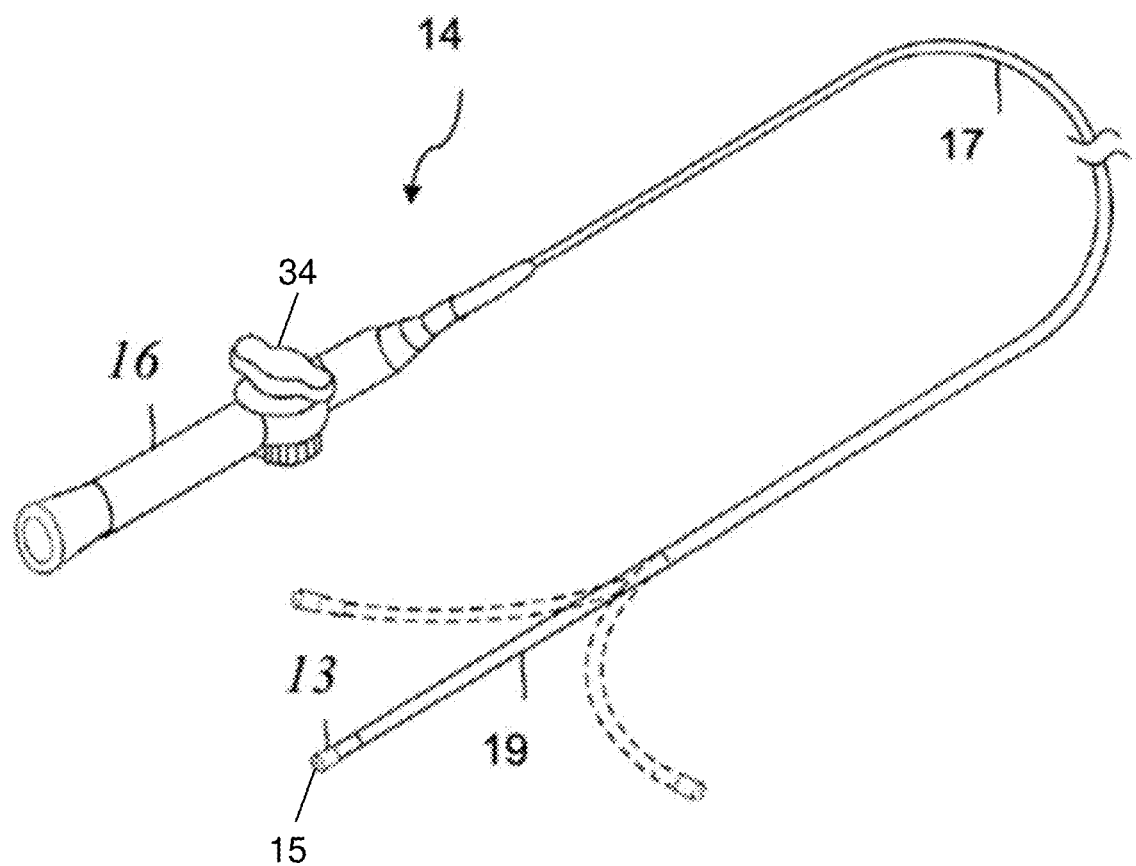
FIG. 2B is a perspective view of a catheter for use with the system of FIG. 1, in accordance with the disclosed technology.

As shown in FIG. 2B, distal tip section 13 can include an electrode assembly and at least one micro-element having an atraumatic distal end adapted for direct contact with target tissue. Catheter body 17 can have a longitudinal axis, and an intermediate section 19 distal of the catheter body 17 that can be uni- or bi-directionally deflectable off-axis from the catheter body 12. Distal of the intermediate section 19 is the electrode assembly carrying at least one micro-element. Proximal of the catheter body is control handle 16 that allows an operator to maneuver the catheter, including deflection of the intermediate section 14.

The elongated catheter body can be a relatively high torqueable shaft with the distal tip section 13 attached to the deflectable intermediate section 19 and containing an electrode assembly 15 with an array of electrodes. For example, the distal tip section 13 can include a 3.5 mm tip dome with three microelectrodes. All of the electrodes may be used for recording and stimulation purposes. A rocker lever 34 can be used to deflect the distal tip section 13. The high-torque shaft also allows the plane of the curved tip to be rotated to facilitate accurate positioning of the catheter tip at the desired site. Three curve type configurations designated "D," "F," and "J" are available. The electrode assembly 15 serves to deliver ablative energy from the ablation generator 50 to the desired ablation site. The electrode assembly 15 and ring electrodes can be made from noble metals. In some examples, the catheter 14 can also include six thermocouple temperature sensors that are embedded in the 3.5 mm tip electrode.

Figure 3A:
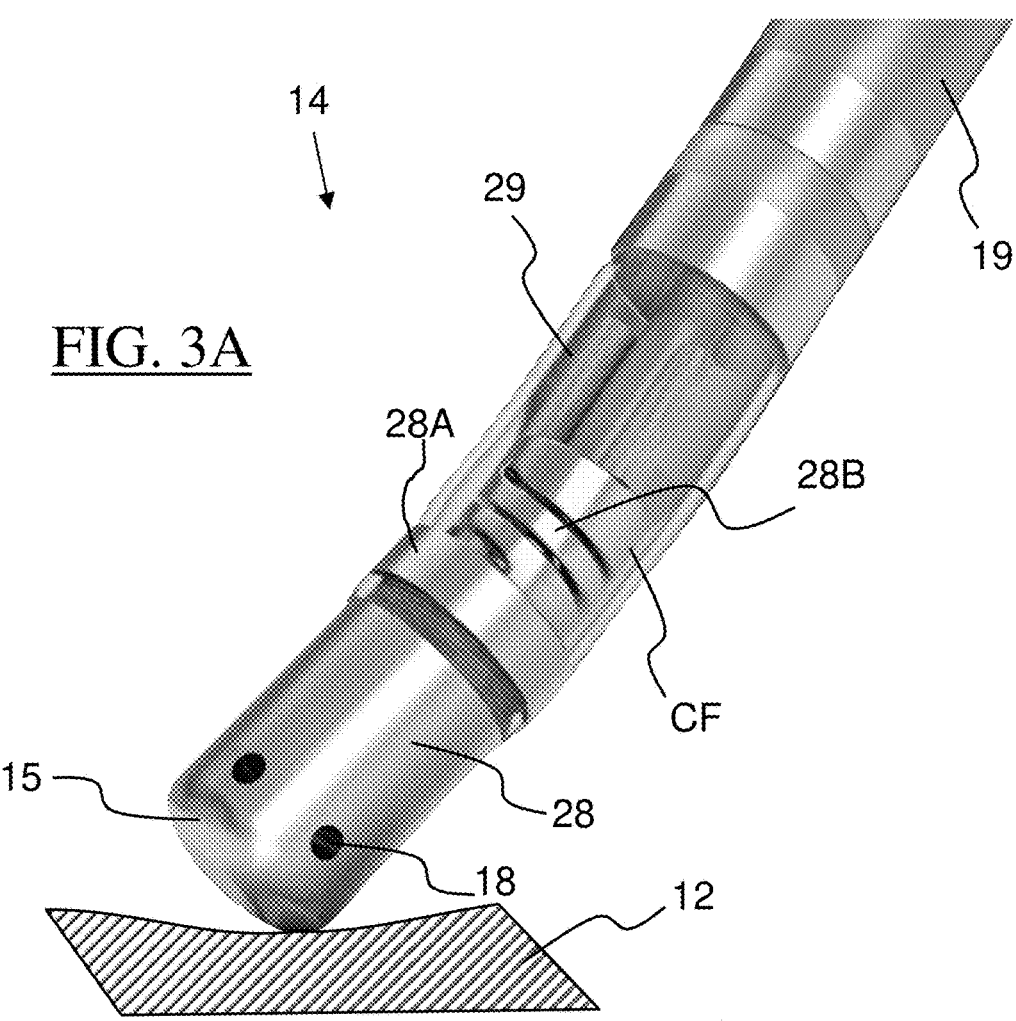
FIG. 3A is a perspective close up view of the catheter distal end with a tip electrode coupled to a contact force sensor, tri-axes location sensor and a catheter shaft.

FIG. 3A illustrates an exemplary end effector of the catheter 14 with a catheter shaft 19 coupled to a magnetic location sensor 29, contact force sensor CF and tip electrode 15. Tip electrode 15 is coupled to the CF sensor via a flexible coupling 28A for tip 28 so that force on tip electrode 15 is transmitted through tip 28 to the flexible coupling 28A which compresses spring 28B of the CF sensor. That is, when a force is applied to the contact force sensor CF via tip electrode 15, a magnetic field sensor disposed inside the CF can detect a change in the magnitude of the force of the magnetic field generated by a separate magnetic field generator coil disposed in the CF sensor. Because the spring constant K of the spring 28B can be predetermined and the distance between the magnetic field generator and the magnetic field sensor can be detected, the force applied to the tip electrode 15 can be determined (e.g., by using Hooke's law, or the equation F=d*K). Details relating to the CF sensor are shown and described in U.S. Pat. Nos. 8,357,152 and 10,688,278, each of which are incorporated by reference in their entirety into this application as if set forth in full and attached in the appendix to priority application U.S. 63/496,218.

Figure 3B:
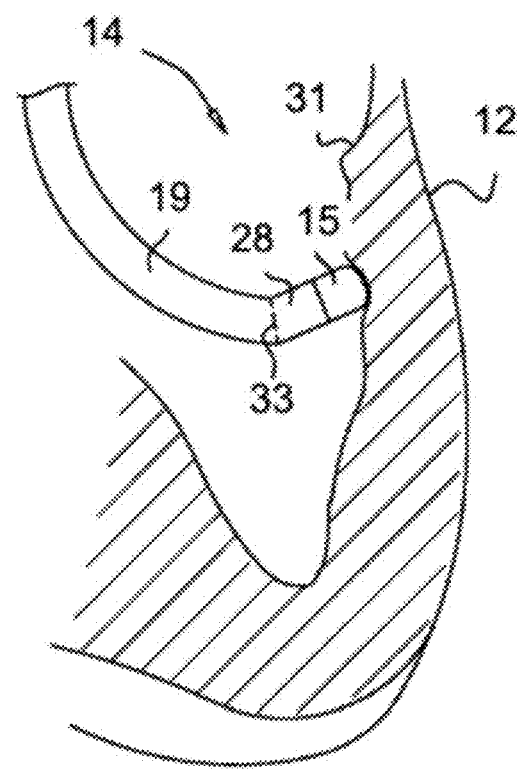
FIG. 3B is a schematic sectional view of a heart chamber with a catheter of FIG. 3A in contact with the heart wall inside the chamber, in accordance with the disclosed technology.

FIG. 3B is a schematic sectional view of a chamber of a heart 12, showing a flexible deflectable intermediate section 19 of a catheter 14 inside the heart 12. The catheter 14 is typically inserted into the heart percutaneously through a blood vessel, such as the vena cava or the aorta. The electrode 15 on a distal tip 28 of the catheter engages endocardial tissue 31. Pressure exerted by the distal tip against the endocardium deforms the endocardial tissue locally, so that electrode 15 contacts the tissue over a relatively large area. In the pictured example, the electrode 15 engages the endocardium at an angle, rather than head-on. Distal tip 28 therefore bends at an elastic joint 33 relative to deflectable intermediate section 19 of the catheter. The bend facilitates optimal contact between the electrode and the endocardial tissue.

Because of the elastic quality of joint 33, the angle of bending of the joint is typically proportional to the pressure exerted by tissue 30 on distal tip 28 (or equivalently, the pressure exerted by the distal tip on the tissue). Measurement of the bend angle thus gives an indication of this pressure. The pressure indication via contact force sensor CF may be used by the operator of catheter 14 to ensure that the distal tip is pressing against the endocardium firmly enough to give the desired therapeutic or diagnostic result, but not so hard as to cause undesired tissue damage. U.S. Pat. Nos. 8,357,152, 9,492,639 and 10,688,278, each of which are incorporated by reference in their entirety into this application as if set forth in full and attached in the appendix to priority application U.S. 63/496,218, describes a system that uses a pressure-sensing catheter in this manner. Catheter 14 may be used in such a system.

Ablation energy generator 50 can generate radio frequency (RF) current pursuant to known RF generators as disclosed in U.S. Pat. Nos. 5,906,614 and 10,869,713 which discloses high power RF generators, both disclosures are incorporated herein by reference with a copy provided in the appendix to priority application U.S. 63/496,218. RF current creates ablation lesions by a thermal process. RF ablation raises tissue temperature and destroys cells through heating. Further, ablation energy generator 50 can also generate pulse field (PF) current to create lesions using irreversible electroporation (IRE). IRE is a predominantly non-thermal process that destroys cells by disrupting the cell membranes. Discussions of a dual mode ablation energy generator 50 capable of producing both RF and PF signals can be found in U.S. Pat. No. 11,540,877, further discussing using PF and RF ablation in combination and is incorporated herein by reference with a copy provided in the appendix to priority application U.S. 63/496,218.

System Components, Setup, and Connectivity

To conduct an electrophysiology procedure of the present disclosure, the Catheter 14 can include THERMOCOOL SMARTTOUCH™ SF Bi-Directional Navigation Catheter (available from Biosense Webster, Inc. of Irvine, California) and Generator 50 can include TRUPULSE™ Generator (available from Biosense Webster, Inc. of Irvine, California) in combination with one or more of the following CE marked devices, available from Biosense Webster, Inc. of Irvine, California:

nGEN™ Pump (D139701)
SmartAblate Irrigation Tubing Sets (SAT001)
Patient Interface Unit (PIU) of CARTO™ 3 system
CARTO™ 3 System and CARTO™ V7.9 workstation
Sterile Catheter Connection Cable (CR3434CT)
Multi-electrode mapping Catheter
≥8.5 Fr Compatible Sheath The following devices, CE marked by other companies, can also be used for the procedure:

≥8.5 Fr Compatible Sheath
Electrophysiology (EP) Recording System
Stimulator
Body Surface Electrocardiogram (ECG) Patches and Leads
Indifferent electrode patches
Fluoroscopy/X-Ray System
Cardiac Defibrillator
Intracardiac Ultrasound (Investigator preference, not required)

Figure 4A:
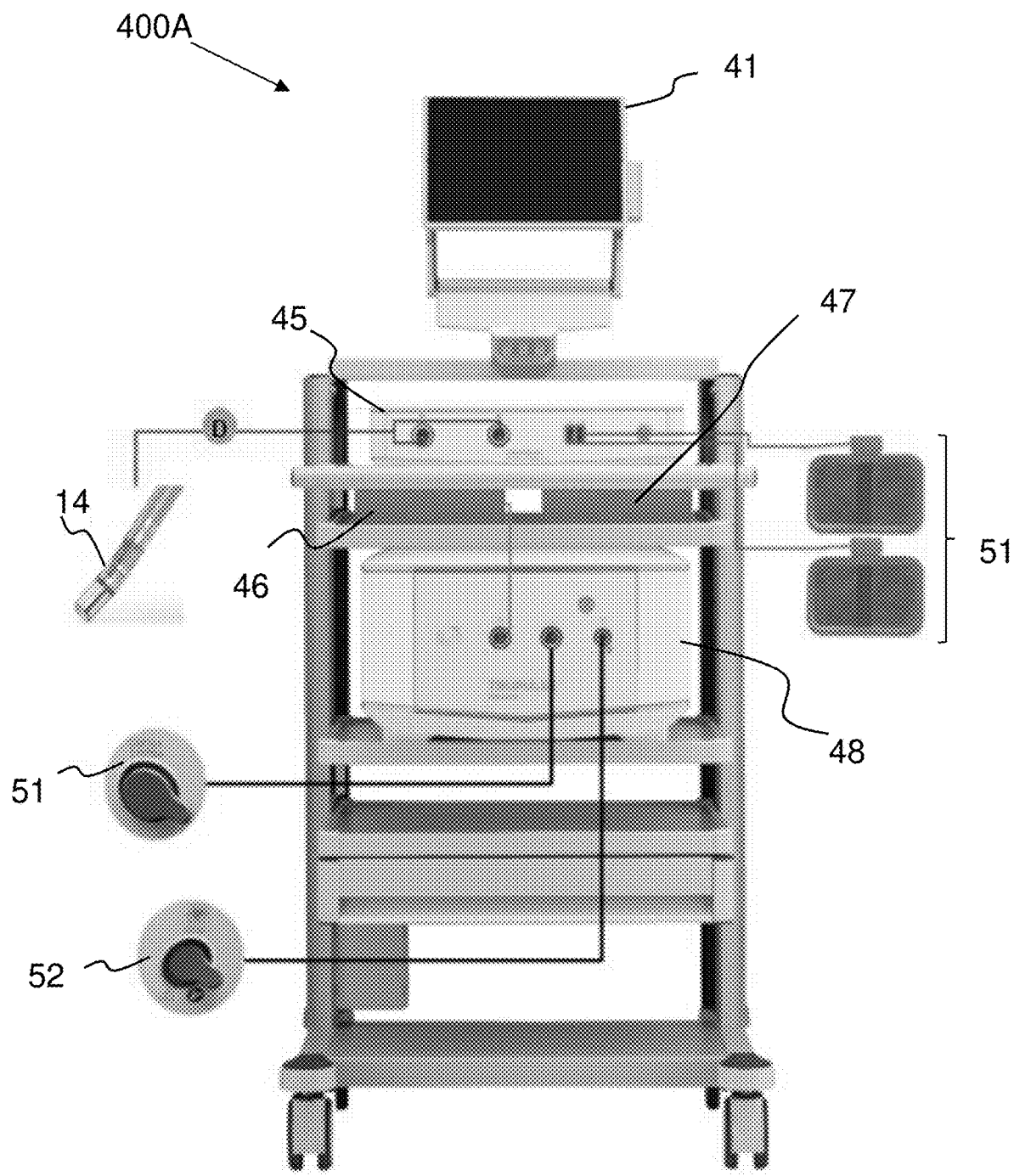
FIGS. 4A and 4B are connectivity diagrams for system set-up, including front view (FIG. 4A) and back view (FIG. 4B), in accordance with the disclosed technology.
Figure 4B:
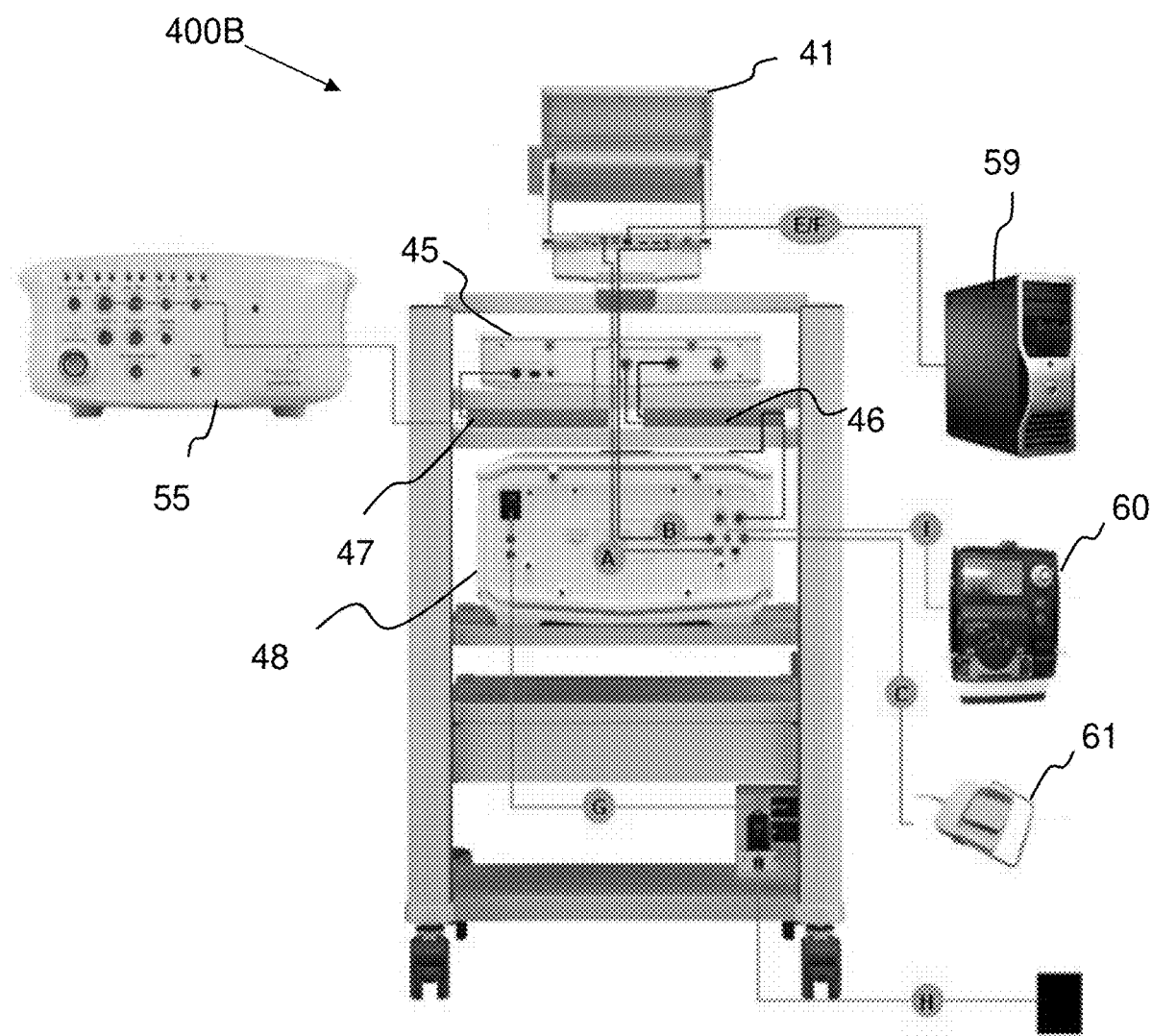

FIGS. 4A and 4B illustrate a connectivity diagram from the front view (FIG. 4A) and the back view (FIG. 4B) for system set up and connectivity of system 400. As shown in the front view, system 400A includes a monitor 41, catheter 14, a console intercommunications unit (CIU) 45, an interface box 46, CARTO™ Relay Box 47, a console 48, indifferent electrodes 49, a safety plug for CARTO™ connector 51, and a safety plug for ECG connector 52. In the back view, system 400B includes monitor 41, CIU 45, interface box 46, CARTO™ Relay Box 47, console 48, indifferent electrodes 49, a CARTO™ System PIU 54, CARTO™ 3 workstation 55, nGEN™ pump 60, and a pedal 61. The CARTO™ System PIU is where the cable connections to the patient are made. Generator 50 system comprises a console, monitor, pedal, connection interface unit (CIU) and cables. The console contains the hardware that controls the delivery of energy. The monitor contains a touch screen user interface. It also contains the software that communicates with the generator and external devices. The monitor allows the user to set parameters for the generator and control when energy is delivered. The monitor is connected directly to the console. The pedal is an alternate way to start and stop ablation. The CIU connects the catheter and indifferent electrodes and enables the interface to the CARTO™ system. There is also a cable connecting the generator components to each other and to other devices. A summary of the devices and function are provided in FIG. 5.

Typical RF ablation creates lesions with a depth/size of about 3 mm to about 5 mm. One example of the parameters used to create the RF ablated lesions are setting a power of the RF signal to about 1 Watt to about 400 Watts. Further, the RF signal is maintained for about 1 second to about 60 seconds. Given that RF ablation uses heat to damage the tissue, RF signals typically generate a temperature change in the tissue from about 20° C. to about 70° C. This temperature change is the temperature increase above typical body temperature.

Typical PFA is different from RF ablation in that at least the PF signals generate a temperature change of only a few degrees. PFA typically creates lesions in the patient's tissue sized between about 4 mm to about 6 mm. To create the lesions, a voltage of the PF signal is set to about 900 volts to about 3000 volts. Further, the PF signals are typically generated using particular waveforms.

Typically, during PF signal delivery, the ECG lines are temporarily disconnected from the CARTO™ system PIU such that only noise from a disconnected line is shown. This noise can cover the ECG window and can be distracting to the physician and prevent ECGs collected prior to the disconnection from being seen. Since the CARTO™ system is notified when PF signal delivery will occur, and similarly, when the ECG line disconnect will occur, the CARTO™ system can dim the ECG during the period of disconnect so that the operator is not distracted. When the ECG is reconnected, the CARTO™ system can then return the ECG signal to its full brightness. Alternatively, or in addition thereto, the ECG signal can be shown as 0V or sent to a background display.

In some embodiments, the device can be used for the purpose of either (1) PVI (i.e., touch-up) among all clinically relevant targeted PVs and by subject, or (2) ablation of left atrial non-PV AF targets (i.e., posterior wall) during index ablation procedure or for repeat procedures during blanking period. The term "index ablation procedure" is used herein as a short-hand for an ablation procedure where an ablation index (AI) is obtained during the ablation. The ablation is performed by repeated applications of trains of pulses, as described in more detail below. Briefly, the ablation procedure may have approximately 1 second between each repeat application. Each application can calculate and display the AI. In some embodiments, the AI can incrementally increase after each application, in accordance with the calculated Δ AI.

Ablation Procedure Guidelines

Generator 50 is capable of controlling the delivery of RF and PF energy to catheter 14. The generator 50 includes a touch screen that allows the user to select the energy type and apply ablations. Before energy delivery it is required to verify if RF or PF is selected on the ablation screen. The start button contains a drag feature. After the start button is dragged or the pedal is pressed, there is a countdown until ablation begins. When the stop button is pressed or the pedal is released, the delivery of energy is terminated. To preform RF ablation, the user selects target power and time from the ablation screen. The user may configure the cutoff temperature and warning temperature from the setup screen.

When used with Catheter 14, a peristaltic irrigation pump (e.g., nGEN™ Pump 60) delivers a continuous infusion of 2 mL/min of room temperature heparinized saline (1 u heparin/1 mL saline) when catheter 14 is in the body. The recommended operating flow settings for Catheter 14 are presented in FIG. 6.

To predict and control ablation treatment, it is desired to have a universal and linear PFA scale that corresponds to the size of the lesion. For RF ablation, a possible scale can correspond to a size S of a lesion assumed to be proportional to a product of the force F applied by the catheter to the tissue, the power P dissipated during the ablation procedure, and the time T of the procedure. The RF ablation index is described and shown in U.S. Pat. Nos. 7,306,593; 10,517,670; 11,096,741 which are incorporated by reference with a copy provided in the appendix to priority application U.S. 63/496,218. A software product which utilizes this RF ablation index is offered by Biosense Webster as Visitag Surpoint Software Module for use with Biosense Webster catheters and systems. Ablation Index via PFA is described and shown in US Patent Application Publication No. 2021/0186604, which is incorporated by reference with a copy provided in the appendix to priority application U.S. 63/496,218.

Although the possible scale for RF ablation involves power P, the power is fixed per protocol per device. The relation to lesion size for PFA is mainly based on the number of repetitions of the pulses and train of pulses via the pulse generator RMS output current (I) in the following equation: $P = H \cdot I^2$, where H is a constant. This equation applies to all of the discussion for PFA ablation index below.

Thus, a scale to estimate the size S of the lesion according to this assumption can be given using S from an Eq. 1:

$$S = K \cdot F \cdot P \cdot T \qquad \text{(Eq. 1)}$$

where K is a constant of proportionality, and $P = H \cdot V_p^2$, where $V_p$ is the PFA pulse generator peak output voltage, and the peak electric field in tissue, $E_p$, is proportional to $V_p$. The proportionality constant depends on the type of catheter, including spacing between electrodes.

As is apparent from Eq. 1, an estimate of the size of a lesion given by the equation is linearly proportional to F, to P, and to T, since, in the equation, each of these variables is raised to the power of one; i.e., from Eq. 1 size S is a linear function of F, of P, and of T. In practice, the estimate of lesion size is incremented after each application i of PFA up to maximum number of applications counted as "i" number of PFA applications (preferably i=24 PFA applications) at each tissue location.

In practice, the relationship between lesion size and F, P, and T is proven to be non-linear, and thus the PFA scale would also be non-linear. Following this observation, the exemplary embodiments of the disclosed invention provide a more exact estimate of the size of a lesion from the values of F, P, and T, with a more exact estimate of lesion size given by finding an integral over time of an expression comprising non-linear functions of F, P, and T. The estimate may be applied during PFA of tissue, separate from estimating the volume of the lesion, the depth of the lesion, and/or the diameter of the lesion produced in the tissue, so as to halt PFA when a desired size is reached.

In an exemplary embodiment of the present invention, a universal PFA linear scale, (named hereinafter "ablation index,"; $AI_{PFA}$ or "PFA AI") is derived by calculating a summation over the time period of a product of the contact force and the number of repetition.

In some exemplary embodiments, PFA AI is provided, which is a summation of the force applied and number of applications of the PFA pulses. The values of the PFA AI (for different size/volume of lesions) are determined experimentally and calibrated. For a given type of cardiac structure and given tissue characteristics, the value of the ablation index is expected to be a repeatable predictor of lesion size. Furthermore, lesion size for a given value of PFA AI may vary due to different structures and tissue characteristics.

The power in PFA is constant. In some embodiments, there is one setting of the power for the alation and the user may not adjust the power parameter. The pulsed field ablation is delivering the power in very short trains of pulses (e.g., <0.5 seconds) and rather than basing the index in part on a power factor defined as a function of time, as in US Pat. Appl. Pub No. U.S. 2021/0186604, which is incorporated herein by reference with a copy provided in the appendix to priority application U.S. 63/496,218, there is provided a discrete ablation index based on the number of applications n. As such, the pulsed field ablation index ($AI_{PFA}$) is defined by the formula in Eq. 2:

$$AI_{PFA} = \sum_{i=0}^{n} [AI_n - AI_{n-1}] \qquad \text{(Eq. 2)}$$

where n equals the number of applications of PFA pulses (hereafter referred to as "PFA applications"), has a maximum value of 24, equivalent to the maximum number of pulses, and wherein an Ablation Index for each application of pulses ($AI_n$) is equal to the depth multiplied by a factor A, with the depth being a logarithmic function of force for each application ($force_n$) such that:

$$AI_n = A * (B_n * \ln(\text{force}_n) + C_n) \qquad \text{(Eq. 3)}$$

wherein A is a number ranging between 90 and 130 and preferably equal to 110, $B_n$ is a parameter determined by the equation:

$$B_n = B_0 * \ln(n) + B_1 \qquad \text{(Eq. 4)}$$

where $B_0$ is equal to approximately 0.2653 and $B_1$ is equal to approximately 0.1623, and $C_n$ is a parameter determined by the equation $$C_n = C_0 * \exp(C_1 * n) \qquad \text{(Eq. 5)}$$

where $C_0$ is equal to approximately 0.6862 and $C_1$ is equal to approximately 0.0867.

In some embodiments, $B_n$ and/or $C_n$ may be each independently be set at a constant value for all applications of PFA pulses.

The ablation index from Equation 2 corresponds to one of an estimated volume of a lesion, an estimated depth of the lesion or an estimated diameter of the lesion. In the preferred embodiment, the ablation index provides to the user as a non-dimensional number or range of non-dimensional numbers between a minima and maxima of representing a less than ideal ablation and ideal lesion. In some examples, the ablation index is a non-dimensional scale between 0 and 1000. In other examples, the ablation index is provided as a non-dimensional scale between 250 and 850 so that it can be determined whether a lesion (formed by the ablation) is sufficiently durable despite different electrical modalities (i.e, RF or PF). That is, the ablation index (whether for RF or PF modality) is representative of how effective a lesion is formed by ablation so that a physician or an expert system can decide whether to re-apply a particular modality (i.e., pulsed field energy or radiofrequency) to a previously ablated location (using the same or different modality at such location) so as to ensure sufficient lesion durability. Lesion durability means that the lesion is not likely to have electrical reconnections over months or years after the ablation procedure and therefore prevent atrial fibrillation originating from such lesion in the future. By having such ablation index, it can be decided by the operator, system or physician whether to reapply the previously applied electrical modality (PF) or switch to a different electrical modality (RF) to ensure a durable ablation lesion.

It is intended that the ablation index has the same referential scale whether obtained via the RF ablation index calculation or the PFA ablation index calculation so that ablation index from RF is substantially equivalent to the ablation index obtained from PFA and vice versa. When using catheter 14 for PFA, the ablation index incorporates contact force and number of repetitions (of the pulsed field energy or PFA applications) in a weighted formula to estimate ablation lesion depth and output a predicted ablation index number. Actual ablation index (determined either via RF ablation index calculation or via PFA ablation index calculation) obtained during the actual ablation with PFA or RF can be used to compare with the predicted ablation index (for RF or PFA). Based on the predicted ablation index and how close the correlation with the actual ablation index may be, the physician can decide for or against ablating at a specific location or even to repeat the ablation. In addition, based on the predicted ablation index, the physician can decide if more or less contact force is desired during ablation. The energy generator and associated controller to control RF energy or the PFA pulses, pulse trains or PFA applications are shown and described in U.S. Patent Application Publication No. 2021/0186604, which is hereby incorporated by reference with a copy provided in the appendix to priority application U.S. 63/496,218.

Figures 6, 7:
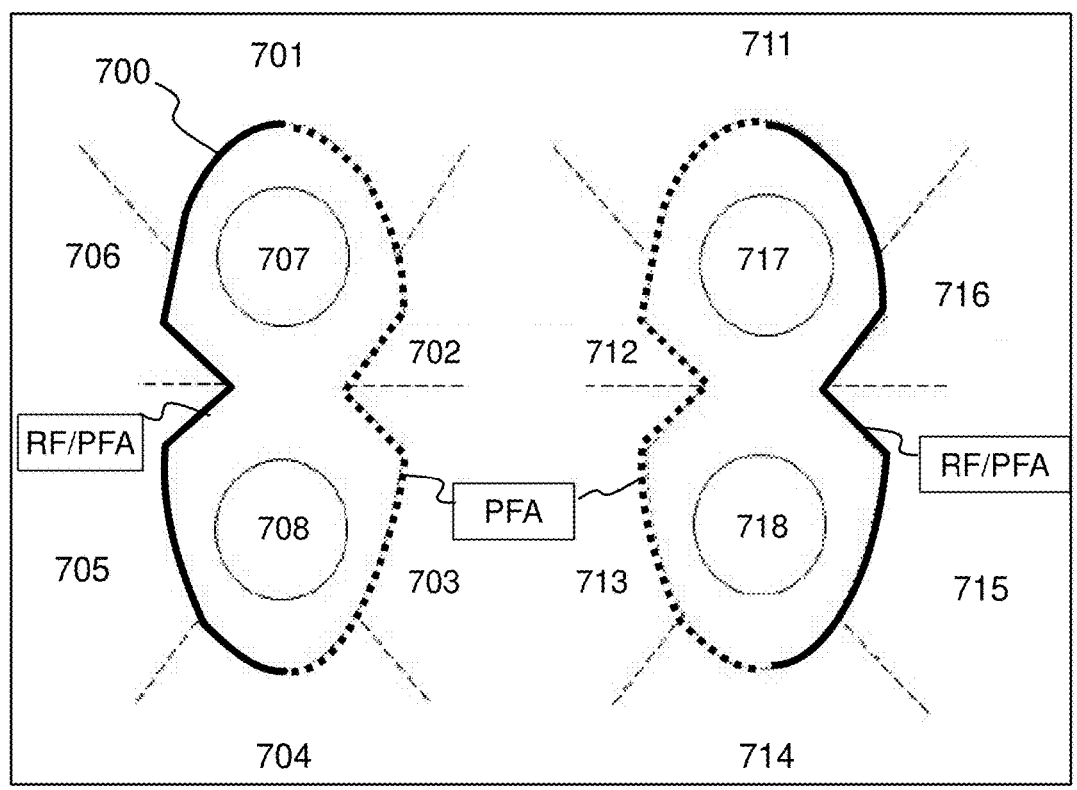
FIG. 6 is a table summarizing recommended operating flow settings for a catheter, in accordance with the disclosed technology.
FIG. 7 provides a schematic illustration of VISITAG™ settings for segmenting the left atrium during the procedure of the study, in accordance with the disclosed technology.

FIG. 7 provides an illustration of segments of conduction gaps observed during the ablation index procedure. A first encircling ablation line 700 is represented by both the thick solid lines and the thick dashed lines. The solid line represent ablation lesions with an ablation index target values ≥550 while the dashed line represent ablation index target values ≥400 but <550. Conduction gaps can be divided into "residual gaps" and "reconnection gaps" based on their timing and characteristics. Pulmonary vein electrical conduction remaining after an initial anatomical burn is referred to as a "residual gap." Acute reconnections (whether located at residual gaps or elsewhere) detected during the rest of the procedure are named as a "reconnection gaps." Where additional RF energy is applied for touch-up, "success tags" are assigned to the last tag where local PV potential is confirmed to disappear. The two adjacent tags associated with the success tags are termed "gap-related tags." The remaining tags from the first encirclement 700 are referred to as "non-gap tags." Each PV is divided into six segments (i.e. roof, superior anterior, inferior anterior, superior posterior, inferior posterior, and inferior) for subsequent analyses. Including two additional areas near the esophagus and otherwise unclassified regions, a total of 16 segments were assigned by CARTO™ operators, including the following:

LRF, left roof 701;
LSPST, left superior posterior 702;
LIPST, left inferior posterior 703;
LINF, left inferior 704;
LIANT, left anterior 705;
LSANT, left superior anterior 706;
LSPV, left superior pulmonary vein 707;
LIPV, left inferior pulmonary vein 708;
RRF, right roof 711;
RSPST, right superior posterior 712;
RIPST, right inferior posterior 713;
RINF, right inferior 714;
RIANT, right anterior 715;
RSANT, right superior anterior 716;
RSPV, right superior pulmonary vein 717;

RIPV, right inferior pulmonary vein 718;

The ablation procedure can include the following steps:

Confirmation of ACT≥300 seconds prior to start ablation with investigational catheter and systematic anticoagulation with heparin should be administrated. ACT must be targeted to be maintained ≥300 seconds throughout the ablation. ACT level must be checked on regular basis while investigational device is in the left atrium. If ACT is below 300 seconds, systematic anticoagulation with heparin should be administrated to ensure an ACT target of 300 seconds without pausing ablation procedure.

Introduce the compatible 8.5 Fr or greater sheath, if not used for mapping. Before inserting the sheath into the patient, flush the sheath with heparinized normal saline to remove air bubbles.

Introduce Catheter 14 as per Instructions for use (IFU).

When position is satisfactory, commence energy delivery with catheter 14 per recommended workflow.

For subjects undergoing pulmonary vein isolation, the procedure can further require the following:

Use point-by-point ablation to obtain a contiguous lesion set for ipsilateral PV isolation.

Create VISITAG™ settings in order to segment the left atrium during the procedure according to the image in FIG. 7.

Use the ablation parameters, and VISITAG™ targets as recommended by IFU and per physician training.

Evaluate the Inter-tag Distance (ITD) using the VISITAG™ Module distance tool. An ITD of ≤6 mm is recommended.

Prepare 1-2 mg nitroglycerine for either intravenous or intracoronary administration to limit/reduce coronary spasm when ablating near the coronary artery.

All subjects will undergo PV ablation with the investigational device until PVI is achieved in all targeted PV's, including PF is recommended to be used as the primary ablation modality for achieving PVI Power controlled irrigated RF can be used for the anterior wall and ridge upon clinical judgement and per investigator discretion.

ONLY after investigator deems unable to achieve PVI with the investigational device, a commercial (RF) system can be used to complete the procedure (PVI only).

Confirmation of entrance block (exit block is optional) (PVI) of all clinically relevant targeted PVs To verify entrance block, analyze electrograms in coronary sinus and/or atrial paced rhythm to confirm that no PV potentials are present.

After pulmonary vein isolation, the procedure can include the following steps:

Administer adenosine/isoproterenol for each clinically relevant targeted PV to rule out dormant conduction.

If any, treat reconnected PV regions by reviewing remaining signals on reconnection location and deliver energy in corresponding locations. As per above recommendation, PF is the primary modality, but RF can be used based on clinical judgement.

Confirm and document of final entrance block (exit block is optional) (PVI) of all clinically relevant targeted PVs To verify entrance block, analyze electrograms in coronary sinus and/or atrial paced rhythm to confirm that no PV potentials are present.

Use a multi-electrode mapping catheter for confirmation per investigators choice The ablation procedure is considered complete when confirmation of entrance block in all clinically relevant targeted PVs is confirmed.

After last application or confirmation of final entrance block (exit block is optional) at the right sided PVs, evaluate diaphragmatic capture while pacing the phrenic nerve. NOTE: in case of deep sedation a fluoroscopic evaluation of the diaphragm might be used.

A post paced activation and bipolar voltage map may be created at physician discretion and if SOC.

For subjects participating in PVI durability subset:

creation of paced activation map and bipolar voltage map, utilizing the same multi-electrode mapping catheter as pre-procedure.

For ablation outside the PV region, a right atrial CTI linear ablation is allowed only in cases with documented typical atrial flutter identified either prior to or during the procedure. The investigational system, Catheter 14 with generator 50 in RF and/or PF mode should be used based upon investigator decision. If block of CTI line cannot be achieved with the investigational system, a commercially approved RF catheter with a compatible commercially available RF generator may be used. Prophylactic ablation outside the PV region (in example SVC, PW, roofline) is not allowed in the study.

Figure 8:
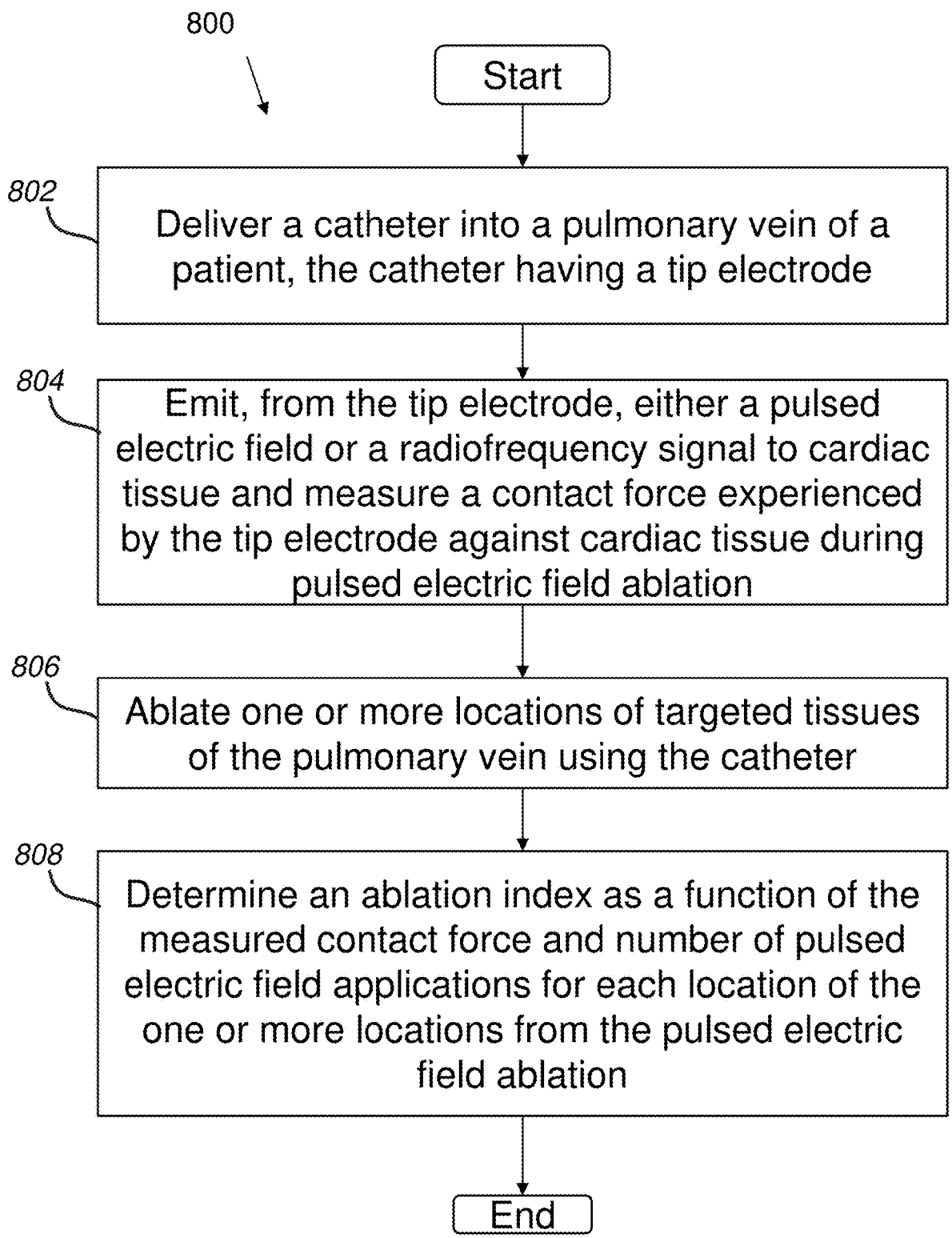
FIG. 8 illustrates a flowchart of a method for treating atrial fibrillation in a group of patients using RF energy and PFA energy, in accordance with the disclosed technology.

FIG. 8 illustrates an example of a method 800 of applying pulsed field ablation to treat atrial fibrillation. The method 800 can include delivering a catheter 14 into a pulmonary vein of a patient, the catheter 14 having a tip electrode (Step 802). Method 800 further includes emitting, from the tip electrode, either a pulsed electric field or a radiofrequency signal to cardiac tissue and measure a contact force experienced by the tip electrode against cardiac tissue during pulsed electric field ablation (Step 804) to provide an estimated lesion depth represented by a range of non-dimensional values (as described in relation to FIG. 9). Once in contact, the method 800 can include ablating one or more locations of targeted tissues of the pulmonary vein using the catheter 14 (Step 806). After ablating targeted tissues, the method 800 can include determining an ablation index AI (from FIG. 9) from the ablation as a function of the measured contact force and number of pulsed electric field applications for each location of the one or more locations for the pulsed electric field ablation (Step 808). Although not depicted, in some embodiments, after ablating targeted tissues, the method 800 can achieve an effectiveness rate of pulmonary vein isolation in the patient.

In some examples, method 800 can further include applying, to the targeted tissue, a first ablation signal comprising forming a first lesion comprising a first size with little or no first temperature change in a temperature of the targeted tissue. In one example, the first ablation signal can be the RF ablation signal. However, in other examples, the PF ablation signal can be the first ablation signal. The first ablation signal can form a first lesion comprising a first size and generate a first temperature change in the tissue. A second ablation signal can be applied to the tissue with the electrode to form a second lesion in the tissue. In the example, the second ablation signal can be different from the first ablation signal. The second lesion can be formed with a second size. The second ablation signal can generate a second temperature change in the tissue different from the first temperature change by at least 10° C. As above, if the RF signal is the first signal, the PFA signal can be the second signal. Where RF ablation causes tissue temperature changes greater than 20° C., the PFA causes a temperature change of just a few degrees.

Alternately a first lesion can be formed with little or no first temperature change in a temperature of the tissue and a second lesion can be formed by generating a second temperature change in the tissue different from the first temperature change by at least 10° C.

Although not depicted, method 800 can include forming a combined lesion which can result from applying the first ablation signal and the second ablation signal. The deeper/larger combined lesion can be formed from the combination of the first lesion and the second lesion having a combined size. The combined size can be about 20% to about 40% greater than either of the first size and the second size. The ablation signals can be applied sequentially. This can include first applying the RF signal and then applying the PF signal or visa-a-versa. However, given that the RF signals can be generated using alternating current (AC) and the PF signals can be generated using very short pulses of direct current (DC), another example can have both signals generated at the same time or at least having some overlap of application of the RF and PF signals. Additionally, contact force between the tissue and the electrode is known to be a factor in the effectiveness of creating a lesion. In one example the contact force can be about 5 grams to about 40 grams.

Figure 9:
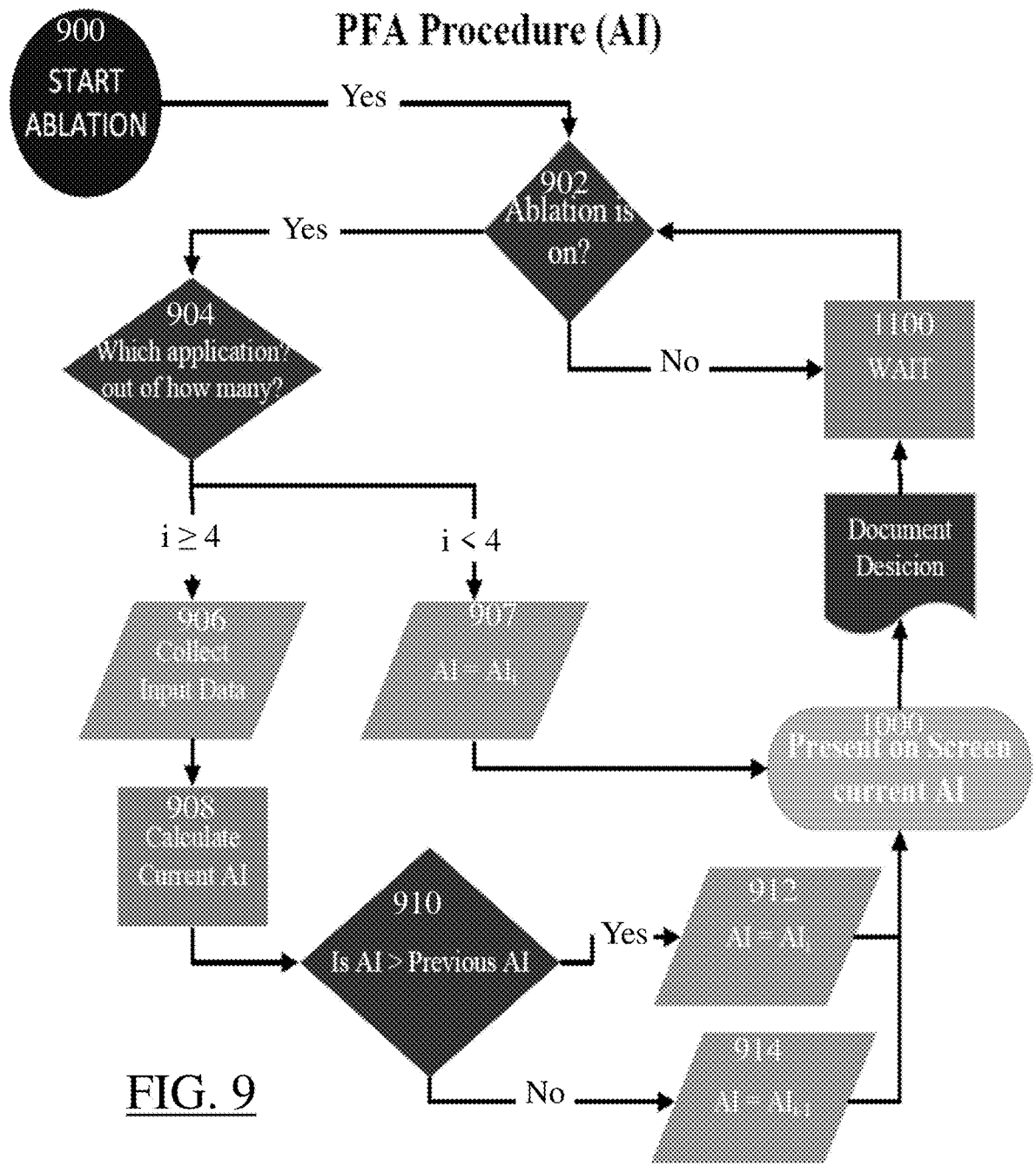
FIG. 9 illustrates an overall flow chart of the ablation index for PFA as utilized for flow chart of FIG. 8, in accordance with the disclosed technology.

The determination of the ablation index (AI) for PFA at each tissue location can be obtained via the flow chart shown in FIG. 9. FIG. 9 is a high level block diagram for determination of the AI. The ablation index for PFA (hereafter "AI") begins with the Start Ablation command 900 from the generator monitor. If no ablation is being performed from query 902, the system moves to a wait state at 1100. On the other hand, if ablation is determined to be ongoing at step 902, the processor receives the required input data such as the current count or i number of PFA application from the monitor. At step 902, the processor determines if ablation by PFA is currently being applied via tip electrode 15 to the tissue location. If yes, the processor queries at 904 as to the current count of PFA applications (with counter "i") being applied via tip electrode 15 at this specific tissue location. The processor queries at step 907 whether the i number of PFA applications is 4 or greater at this location. If the i number of PFA applications is 4 or greater at this location, then the Ablation Index for this count i of ablation Ali is calculated at step 908. A query is made at step 910 to compare the current AI to the previous AI. In query 910 if the current AI is greater than previous then the processor sets the AI at step 912 to be presented to the user as the AI from the current count i of PFA applications. That is, for each application of PFA, the algorithm compares in query 910 the current result of the AI to the AI of the previous PFA application and chooses the higher value (and in one embodiment, multiplies it by a coefficient of 110). The ablation index (AI) is then presented to the user and stored in the system as Ali. If the query in 910 that the $AI_i$ is less than or equal to the previous AI, the AI calculated at the one prior (i-1) ablation $AI_{i-1}$ is set at step 914 to be presented as the current Ali to the user at step 1000. The AI output is stored in a document file and the system returns to a wait state at 1100.

From data generated from various pre-clinical studies, it is noted that there is a general linear correlation between PFA AI (composed of contact force and PFA applications) to lesion depth. The predication accuracy of the AI value was found to be within ±2 mm of accuracy. It is noted that for PFA energy, the tolerance of exceeding the expected value/depth does not raise any additional safety concerns as collateral damage with this energy modality has not been shown to be a risk, as demonstrated in prior studies.

Returning back to query 904 of FIG. 9, if the current count i of PFA applications during ablation at each tissue location is less than 4, at step 907, the processor sets the AI as being the same as the $AI_i$ calculated from the current i number of PFA applications and moves to step 1000 to display the current AI as the AI from the current i number of PFA applications. It is noted that if the current i number of PFA application is less than four at each location, the $AI_i$ of such current count i number of PFA application is, in one embodiment, set to a specified low ablation index number or even zero. It is also noted that the variable $AI_i$ used in a MatLab implementation is the same as variable $AI_n$ discussed for Eq. 3 above.

An ablation system for electrophysiology uses can have an alternating current (AC) signal generator configured to provide radiofrequency signals at high power and a direct current (DC) signal generator configured to provide very short duration with high voltage pulses. The system also includes a catheter having an end effector electrically coupled to the AC signal generator and the DC signal generator. The end effector can have at least one electrode disposed on the end effector so that the electrode delivers the high voltage pulses from the at least one electrode to organ tissue inside a patient to first and second return electrodes coupled to the outside body of the patient and deliver the RF signal between the at least one electrode to one of the first or second return electrodes. The RF signals and the high voltage pulses can be applied either sequentially or simultaneously to the organ tissue.

In an example, the end effector can have a cylindrical member with a distal tip electrode and irrigation ports disposed on the cylindrical member to provide irrigation fluid proximate the distal tip electrode.

Another example can have the distal tip electrode coupled to a force sensor. Further, the radiofrequency signals can be applied with a contact force of approximately 5 grams or more. Also, the radiofrequency signals can be provided having at least 25 Watts of power. The radiofrequency signals can also include a frequency from 350 kHZ to about 500 kHZ and the radiofrequency signals can be provided for a duration of at least 1 second.

For other examples, the high voltage pulses can include an amplitude of at least 800 V. In addition, a duration of each of the high voltage pulse can be less than 20 microseconds and provide a pulse train of approximately 100 microseconds. A time gap of any value selected from 0.3 to 1000 milliseconds can be provided between adjacent pulse trains. These pulse trains can provide a PFA burst. The PFA burst can have any value from 2 to 100 pulse trains with a duration of the PFA burst comprising any value selected from zero to 500 milliseconds. Furthermore, the high voltage pulse can provide approximately 60 Joules or less.

As will be appreciated, method 800 described herein can be varied in accordance with the various elements and examples described herein. That is, methods in accordance with the disclosed technology can include all or some of the steps described above and/or can include additional steps not expressly disclosed above. Further, methods in accordance with the disclosed technology can include some, but not all, of a particular step described above. Further still, various methods described herein can be combined in full or in part.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

The disclosed technology described herein can be further understood according to the following clauses:

Clause 1: A system for applying pulsed field ablation to treat atrial fibrillation, the system comprising: a catheter comprising a tip electrode controlled to emit either a pulsed electric field or a radiofrequency signal to biological tissue and ablate one or more locations of biological tissue of the pulmonary vein; and a processor configured to: measure a contact force experienced by the tip electrode against biological tissue during pulsed electric field ablation, and determine a pulsed field ablation index as a function of the measured contact force and number of pulsed electric field applications for each location of the one or more locations so that it can be determined whether a lesion is sufficiently durable.

Clause 2: The system of Clause 1, wherein the processor is further configured to calculate the pulsed field ablation index defined by the formula: $AI_{PFA}=\Sigma_{i=0}^{n}[AI_n-AI_{n-1}]$, where n is the number of applications of pulsed electric field applications and $AI_n$ is an index for each application of pulses and is defined by the formula: $AI_n=A*(B_n*\ln(force_n)+C_n)$, where A is a number ranging between 90 and 130, $B_n$ is a parameter determined by the formula: $B_n=B_0*\ln(n)+B_1$, and $C_n$ is a parameter determined by the formula: $C_n=C_0*\exp(C_1*n)$.

Clause 3: The system of Clause 2, wherein $B_0$ is equal to approximately 0.2653 and $B_1$ is equal to approximately 0.1623, and $C_0$ is equal to approximately 0.6862 and $C_1$ is equal to approximately 0.0867.

Clause 4: The system of Clause 1, wherein the processor is further configured cease application of the pulsed field ablation applications in response to the calculated pulsed field ablation index reaching a prespecified target ablation index value.

Clause 5: The system of Clause 1, wherein the processor is further configured to present the pulsed field ablation index and the prespecified target ablation index value to a user.

Clause 6: The system of Clause 2, wherein the ablation index corresponds to at least one of an estimated volume of a lesion, an estimated depth of the lesion, or an estimated diameter of the lesion.

Clause 7: The system of Clause 1, the system further comprising:

an alternating current (AC) signal generator configured to provide radiofrequency signals at high power; and a direct current (DC) signal generator configured to provide high voltage pulses.

Clause 8: The system of Clause 7, wherein the radiofrequency signals and the high voltage pulses are applied either sequentially or simultaneously to the organ tissue.

Clause 9: The system of Clause 7, wherein the radiofrequency signals are provided of at least 25 Watts of power.

Clause 10: The system of Clause 7, wherein the radiofrequency signals include a frequency from 350 kHZ to about 500 kHZ and the radiofrequency signals are provided for a duration of at least 1 second.

Clause 11: The system of Clause 7, wherein the high voltage pulses include an amplitude of at least 800 V.

Clause 12: The system of Clause 7, wherein a duration of each of the high voltage pulse is less than 20 microseconds.

Clause 13: The system of Clause 7, wherein a time gap of any value selected from 0.3 to 1000 milliseconds is provided between adjacent pulse trains.

Clause 14: The system of Clause 7, wherein a plurality of pulse trains provides a PFA burst, wherein the PFA burst comprises any value from 2 to 100 pulse trains with a duration of the PFA burst comprising any value selected from zero to 500 milliseconds.

Clause 15: The system of Clause 7, wherein the high voltage pulse provides approximately 60 Joules or less.

Clause 16: The system of Clause 1, wherein the processor is further configured to simulate an electric field produced by the pulsed field ablation to estimate at least one of a planned volume of a lesion, a planned depth of the lesion, or a planned diameter of the lesion.

Clause 17: A focal ablation catheter comprising: a tubular member extending along a longitudinal axis between a handle, a contact force sensor, and a tip electrode at a distal end of the tubular member, the tip electrode electrically connected to an energy generator controlled to emit either a pulsed electric field or a radiofrequency signal to biological tissue through the tip electrode at one or more locations of biological tissue under control of a processor to ablate biological tissue, the contact force sensor being coupled to the tip electrode and electrically connected to the processor to provide indication of a contact force experienced by the tip electrode against biological tissue during pulsed electric field ablation so that an ablation index is determined as a function of the measured contact force of the tip electrode and number of pulsed electric field applications for each location of the one or more locations in a heart.

Clause 18: The catheter of Clause 17, wherein the pulsed field ablation index is determined by the formula: $AI_{PFA}=\Sigma_{i=0}^{n}[AI_n-AI_{n-1}]$, where n is the number of applications of pulsed electric field applications and $AI_n$ is an index for each application of pulses and is defined by the formula: $AI_n=A*(B_n*\ln(force_n)+C_n)$, where A is a number ranging between 90 and 130, $B_n$ is a parameter determined by the formula: $B_n=B_0*\ln(n)+B_1$, and $C_n$ is a parameter determined by the formula: $C_n=C_0*\exp(C_1*n)$.

Clause 19: The catheter of Clause 17, wherein $B_0$ is equal to approximately 0.2653 and $B_1$ is equal to approximately 0.1623, and $C_0$ is equal to approximately 0.6862 and $C_1$ is equal to approximately 0.0867.

Clause 20: A method for applying pulsed field ablation to treat atrial fibrillation, the method comprising: delivering a tip electrode; emitting, from the tip electrode, either a pulsed electric field or a radiofrequency signal to biological tissue and measuring a contact force experienced by the tip electrode against biological tissue during emission of pulsed electric field; ablating one or more locations of targeted tissues of the pulmonary vein with the tip electrode; and determining an ablation index as a function of a representation of the measured contact force of the tip electrode and number of pulsed electric field applications for each location of the one or more locations from the pulsed electric field ablation so that a determination can be made as to whether a lesion is sufficiently durable.

The embodiments described above are cited by way of example, and the present invention is not limited by what has been particularly shown and described hereinabove. Rather, the scope of the invention includes both combinations and sub combinations of the various features described and illustrated hereinabove, as well as variations and modifications thereof which would occur to persons skilled in the art upon reading the foregoing description and which are not disclosed in the prior art.

What is claimed is:

1. A system for applying pulsed field ablation to treat atrial fibrillation, the system comprising:
   a catheter comprising a tip electrode controlled to emit either a pulsed electric field or a radiofrequency signal to biological tissue and ablate one or more locations of biological tissue of a pulmonary vein; and
   a processor configured to:
      measure a contact force experienced by the tip electrode against biological tissues during pulsed electric field ablation,
      determine a pulsed field ablation index as a function of the measured contact force and number of pulsed electric field applications for each location of the one or more locations so that it can be determined whether a lesion is durable, wherein determining the pulsed field ablation index is defined at least in part by the formula:

$$AI_{PFA} = \sum_{i=0}^{n}[AI_n - AI_{n-1}],$$

where n is the number of applications of pulsed electric field applications and $AI_n$ is an index for each application of pulses and is defined by the formula:

$$AI_n = A*(B_n*\ln(\text{force}_n) + C_n).$$

2. The system of claim 1,
wherein A is a number ranging between 90 and 130, $B_n$ is a parameter determined by the formula:

$$B_n = B_0 * \ln(n) + B_1,$$

and $C_n$ is a parameter determined by the formula:

$$C_n = C_0 * \exp(C_1 * n).$$

3. The system of claim 2, wherein
$B_0$ is equal to approximately 0.2653 and $B_1$ is equal to approximately 0.1623, and
$C_0$ is equal to approximately 0.6862 and $C_1$ is equal to approximately 0.0867.

4. The system of claim 1, wherein the processor is further configured to cease application of the pulsed field ablation applications in response to the calculated pulsed field ablation index reaching a prespecified target ablation index value.

5. The system of claim 1, wherein the processor is further configured to present the pulsed field ablation index and a prespecified target ablation index value to a user.

6. The system of claim 2, wherein the pulsed field ablation index corresponds to at least one of an estimated volume of a lesion, an estimated depth of the lesion, or an estimated diameter of the lesion.

7. The system of claim 1, the system further comprising:
   an alternating current (AC) signal generator configured to provide radiofrequency signals at high power; and
   a direct current (DC) signal generator configured to provide high voltage pulses.

8. The system of claim 7, wherein the radiofrequency signals and the high voltage pulses are applied either sequentially or simultaneously to biological tissue.

9. The system of claim 7, wherein the radiofrequency signals are provided of at least 25 Watts of power.

10. The system of claim 7, wherein the radiofrequency signals include a frequency from 350 kHZ to about 500 kHZ and the radiofrequency signals are provided for a duration of at least 1 second.

11. The system of claim 7, wherein the high voltage pulses include an amplitude of at least 800 V.

12. The system of claim 7, wherein a duration of each of the high voltage pulses is less than 20 microseconds.

13. The system of claim 7, wherein a time gap of any value selected from 0.3 to 1000 milliseconds is provided between adjacent pulse trains of the pulses.

14. The system of claim 7, wherein a plurality of pulse trains provides a PFA burst, wherein the PFA burst comprises any value from 2 to 100 pulse trains with a duration of the PFA burst comprising any value selected from zero to 500 milliseconds.

15. The system of claim 7, wherein the high voltage pulse provides approximately 60 Joules or less.

16. The system of claim 1, wherein the processor is further configured to simulate an electric field produced by the pulsed field ablation to estimate at least one of a planned volume of a lesion, a planned depth of the lesion, or a planned diameter of the lesion.

17. A focal ablation catheter comprising:
   a tubular member extending along a longitudinal axis between a handle, a contact force sensor, and a tip electrode disposed at a distal end of the tubular member,
   the tip electrode electrically connected to an energy generator controlled to emit either a pulsed electric field or a radiofrequency signal to biological tissue through the tip electrode at one or more locations of biological tissue under control of a processor to ablate biological tissue,
   the contact force sensor being coupled to the tip electrode and electrically connected to the processor to provide indication of a contact force experienced by the tip electrode against biological tissue during pulsed electric field ablation so that an ablation index is determined by the processor as a function of the measured contact force of the tip electrode and number of pulsed electric field applications for each location of the one or more locations in a heart, wherein the ablation index is determined at least in part by the formula:

$$AI_{PFA} = \sum_{i=0}^{n}[AI_n - AI_{n-1}],$$

where n is the number of applications of pulsed electric field applications and $AI_n$ is an index for each application of pulses and is defined by the formula:

$$AI_n = A*(B_n*\ln(\text{force}_n) + C_n).$$

18. The catheter of claim 17, wherein the pulsed field ablation index
wherein A is a number ranging between 90 and 130, $B_n$ is a parameter determined by the formula:

$$B_n = B_0*\ln(n) + B_1,$$

and $C_n$ is a parameter determined by the formula:

$$C_n = C_0*\exp(C_1*n).$$

19. The catheter of claim 17, wherein
$B_0$ is equal to approximately 0.2653 and $B_1$ is equal to approximately 0.1623, and
$C_0$ is equal to approximately 0.6862 and $C_1$ is equal to approximately 0.0867.

20. A method for applying pulsed field ablation to treat atrial fibrillation, the method comprising:
delivering a tip electrode;
emitting, from the tip electrode, either a pulsed electric field or a radiofrequency signal to biological tissue and measuring a contact force experienced by the tip electrode against biological tissue during emission of a pulsed electric field;
ablating one or more locations of targeted tissues of the pulmonary vein with the tip electrode; and
determining an ablation index as a function of a representation of the measured contact force of the tip electrode and number of pulsed electric field applications for each location of the one or more locations from the pulsed electric field ablation so that a determination can be made as to whether a lesion is sufficiently durable, wherein the ablation index is determined at least in part by the formula:

$$AI_{PFA} = \Sigma_{i=0}^{n}[AI_n - AI_{n-1}],$$

where n is the number of applications of pulsed electric field applications and $AI_n$ is an index for each application of pulses and is defined by the formula:

$$AI_n = A*(B_n*ln(\text{force}_n) + C_n).$$

* * * * *